United States Patent
Chiu

(10) Patent No.: US 11,656,791 B2
(45) Date of Patent: May 23, 2023

(54) DATA STORAGE DEVICE AND DATA PROCESSING METHOD WITH OVERLAPPED PERFORMANCE TIME OF DIFFERENT OPERATIONS CORRESPONDING TO THE SAME DATA TO IMPROVE ACCESS PERFORMANCE OF THE DATA STORAGE DEVICE

(71) Applicant: Silicon Motion, Inc., Hsinchu County (TW)

(72) Inventor: Shen-Ting Chiu, Miaoli County (TW)

(73) Assignee: Silicon Motion, Inc., Hsinchu County (TW)

( * ) Notice: Subject to any disclaimer, the term of this patent is extended or adjusted under 35 U.S.C. 154(b) by 37 days.

(21) Appl. No.: 17/329,189

(22) Filed: May 25, 2021

(65) Prior Publication Data
US 2021/0373800 A1    Dec. 2, 2021

(30) Foreign Application Priority Data

May 26, 2020 (TW) ................................. 109117419

(51) Int. Cl.
*G06F 3/06* (2006.01)

(52) U.S. Cl.
CPC .......... *G06F 3/0656* (2013.01); *G06F 3/0611* (2013.01); *G06F 3/0619* (2013.01); *G06F 3/0653* (2013.01); *G06F 3/0679* (2013.01)

(58) Field of Classification Search
CPC .... G06F 3/0679; G06F 3/0653; G06F 3/0619; G06F 3/0611; G06F 3/0656
See application file for complete search history.

(56) References Cited

U.S. PATENT DOCUMENTS

| | | | | |
|---|---|---|---|---|
| 2012/0297268 A1* | 11/2012 | Ishihara | ................. | G11C 29/52 |
| | | | | 714/E11.057 |
| 2019/0012114 A1* | 1/2019 | Spencer | .............. | G06F 12/0866 |
| 2020/0225851 A1* | 7/2020 | Klein | .................... | G06F 3/0689 |

FOREIGN PATENT DOCUMENTS

| | | |
|---|---|---|
| CN | 107402725 A | 11/2017 |
| CN | 109669800 A | 4/2019 |
| CN | 109726147 A | 5/2019 |
| TW | 201227298 A1 | 7/2012 |

* cited by examiner

*Primary Examiner* — Edward J Dudek, Jr.
(74) *Attorney, Agent, or Firm* — Winston Hsu

(57) ABSTRACT

A memory controller coupled to a memory device and a host device and configured to control access operations of the memory device includes a buffer memory, a host interface, a microprocessor and a data protection engine. The host interface is coupled to the host device and configured to write data received from the host device into the buffer memory and issue a buffer memory write complete notification after the data has been written in the buffer memory. The microprocessor is configured to trigger a data protection operation in response to the buffer memory write complete notification. The protection engine is configured to perform the data protection operation to generate corresponding protection information according to the data written in the buffer memory. The microprocessor is configured to directly trigger the data protection operation after confirming that the data has been written in the buffer memory.

10 Claims, 3 Drawing Sheets

DATA STORAGE DEVICE AND DATA PROCESSING METHOD WITH OVERLAPPED PERFORMANCE TIME OF DIFFERENT OPERATIONS CORRESPONDING TO THE SAME DATA TO IMPROVE ACCESS PERFORMANCE OF THE DATA STORAGE DEVICE

BACKGROUND OF THE INVENTION

1. Field of the Invention

The invention relates to a data processing method, more particular to a data processing method for effectively protecting data stored in a memory device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve access performance of the data storage device and protect the data stored in the memory device, a novel data processing method to effectively protect data stored in the memory device and to avoid degrading the access performance of the data storage device due to implementation of an error protection mechanism is proposed.

SUMMARY OF THE INVENTION

It is an objective of the invention to effectively protect data stored in the memory device and to avoid degrading the access performance of the data storage device due to implementation of an error protection mechanism.

According to an embodiment of the invention, a memory controller coupled to a memory device and a host device and configured to control access operations of the memory device comprises a buffer memory, a host interface, a microprocessor and a data protection engine. The host interface is coupled to the host device and configured to write data received from the host device into the buffer memory and issue a buffer memory write complete notification after the data has been written in the buffer memory. The microprocessor is configured to trigger a data protection operation in response to the buffer memory write complete notification. The protection engine is configured to perform the data protection operation to generate corresponding protection information according to the data written in the buffer memory. The microprocessor is configured to directly trigger the data protection operation after confirming that the data has been written in the buffer memory.

According to an embodiment of the invention, a data processing method performed by a memory controller coupled to a memory device comprises: writing data received from a host device into a buffer memory of the memory controller; and directly performing a data protection operation to generate protection information corresponding to the data after the data has been written in the buffer memory.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
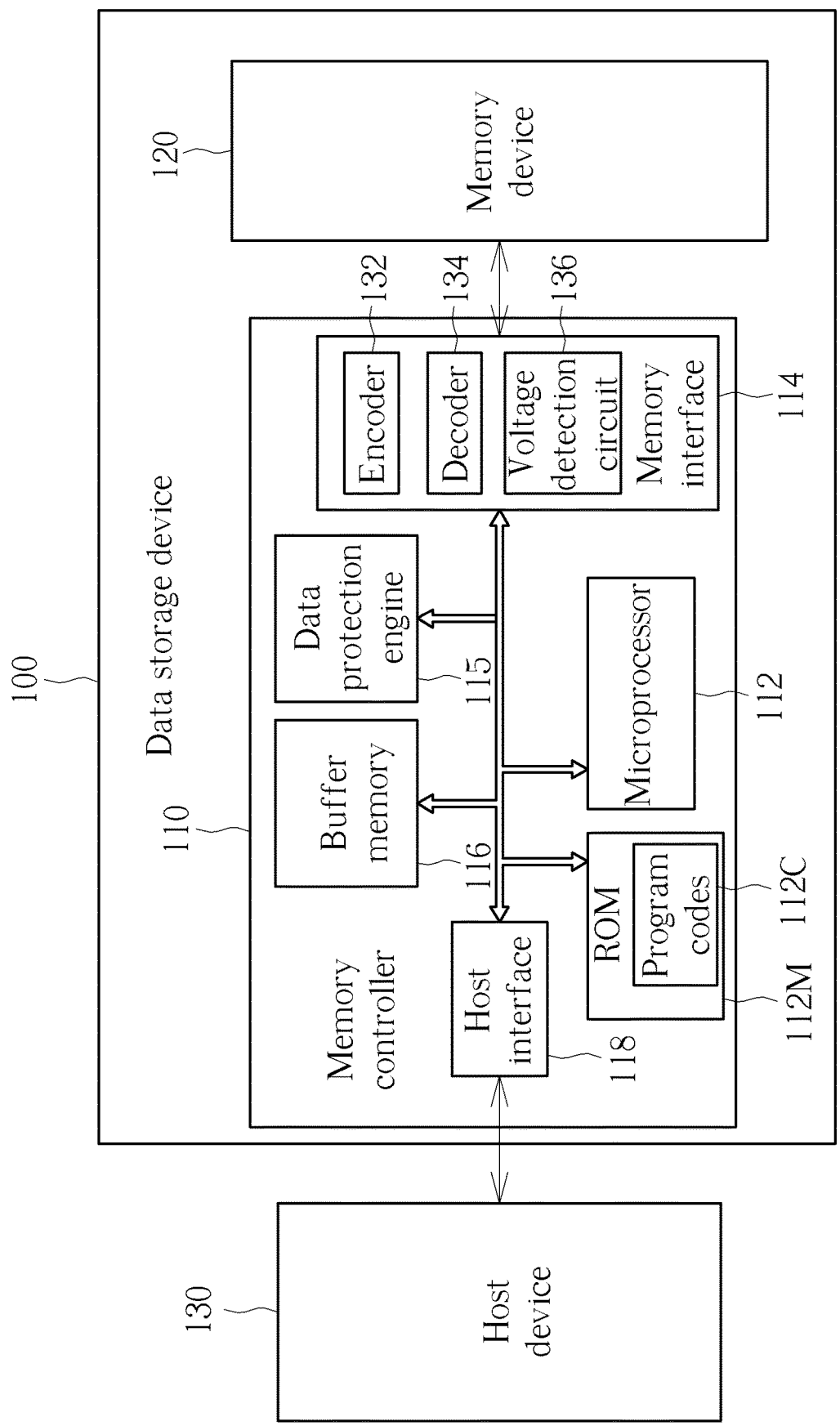
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a memory interface 114, a data protection engine 115, a buffer memory 116 and a host interface 118. The ROM 112M is configured to store program codes 112C. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error. The memory interface 114 may comprise an encoder 132, a decoder 134 and a voltage detection circuit 136. The encoder 132 is configured to encode the data to be written into the memory device 120 to generate the corresponding correction code (or, may be named as an Error Correction Code (ECC). The decoder 134 is configured decode the data read out from the memory device 120. The voltage detection circuit 136 is configured to detect a voltage level of the memory device 120, for example, the voltage level of the power source, and accordingly generate a detection result. The microprocessor 112 may determine whether voltage change has occurred in the power source of the memory device 120 (for example, unstable voltage of the power source) or whether a sudden power off (SPO) has occurred. The data protection engine 115 is configured to generate protection information corresponding to the data received from the host device 130 and configured to repair damaged data or recover lost data according to the protection information. The protection information may be encoded information generated based on the data to be protected. For example, the protection information may be information regarding parity bits. When a portion of data protected by predetermined protection information is damaged or lost, the data protection engine 115 may perform corresponding decoding operations based on the predetermined protection information and the remaining portion of the data protected by the predetermined protection information, thereby deriving the damaged or the lost portion of data.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130. The host interface 118 may be regarded as a front end controller engine, which is configured to transmit communication signals between the memory controller 110 and the host device 130, transmit the read/write data of the host device 130 and control the scheduling of the read/write tasks. The memory interface 114 may be regarded as a backend controller engine, which is configured to transmit communication signals between the memory controller 110 and the memory device 120, transmit the data of to be written into or read from the memory device 120, perform corresponding encoding operations on the data via the encoder 132 before writing the data into the memory device 120 and perform corresponding decoding operations on the data via the decoder 134 after reading the data from the memory device 120.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the MMC interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM), such as a Static RAM (SRAM), but the invention should not be limited thereto. In other embodiments, the buffer memory 116 may be a Dynamic RAM (DRAM).

In an embodiment of the invention, the data storage device 100 may be a portable storage device (for example, the memory card in compliance with the SD/MMC, CF, MS, XD and/or UFS standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data. According to an embodiment of the invention, the memory device 120 may be a 3D NAND-type flash memory device.

Generally, in order to protect the memory device from having valid data loss due to the damage of the memory cells, the protection mechanism adopted by Redundant Array of Independent Disks (RAID) technology may be utilized in the memory device for data protection. In the protection mechanism adopted by RAID, parity information is calculated by the memory controller based on the data written in the memory device. When valid data loss occurs, the parity information can be used to reversely derive the content of lost valid data.

However, in some circumstances, the damage in memory cell or damage in the data may have already occurred during the time when writing the data into the memory device. The damaged memory cell may cause error in the data stored therein. For example, a damaged memory cell may be unable to maintain a fixed voltage level. Therefore, every time when reading the data stored in the damaged memory cell, the memory controller 110 may obtain a different value. In this manner, the content of lost valid data cannot be reversely derived based on this data.

Considering the aforementioned situations, in order to ensure that the protection information is generated based on the undamaged data (that is, the correct data), the task scheduling of the memory controller is usually well designed so that the corresponding protection information calculation will only be started after confirming that the data has been successfully written in the memory device and no error or damage has occurred in the written data, or will only be started after obtaining information regarding the correct data.

However, such task scheduling greatly degrades the write efficiency of the memory device 120. For example, since the buffer memory 116 has to keep the data received from the host device 130 (hereinafter called the host data) until the corresponding protection information has been generated by the data protection engine 115, the memory space of the buffer memory 116 utilized for storing the host data will not be released and utilized for storing next host data before the corresponding protection information has been generated by the data protection engine 115. In this manner, neither the memory space utilization of the buffer memory 116 nor the write efficiency of the memory device 120 can be improved.

To solve the aforementioned problems, a novel data processing method with novel task scheduling is provided to effectively protect the data stored in a memory device. Via the novel task scheduling, both the memory space utilization of the buffer memory 116 and the write efficiency of the memory device 120 can be greatly improved.

Figure 2:
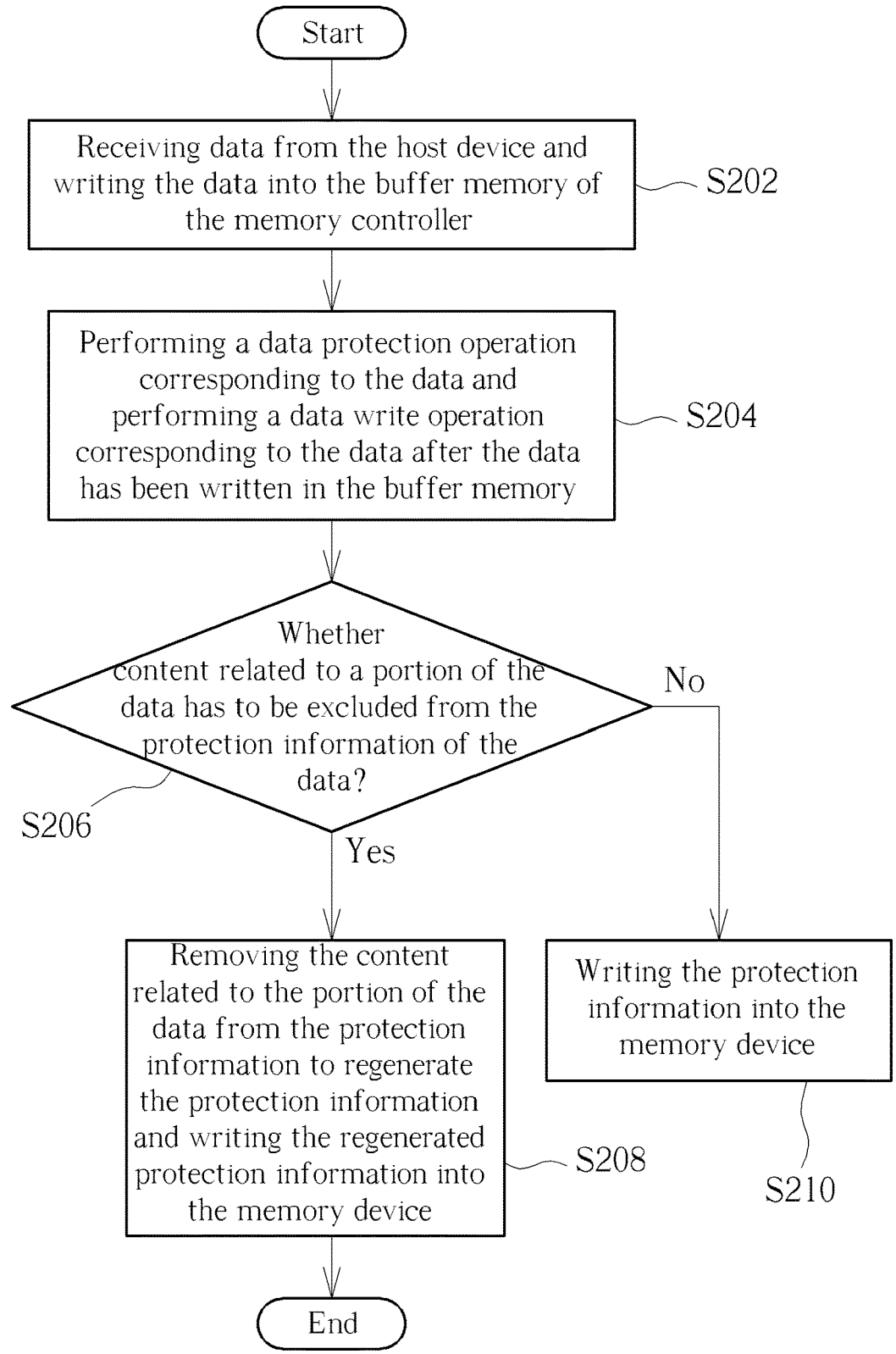
FIG. 2 shows an exemplary flow chart of a data processing method according to an embodiment of the invention.

FIG. 2 shows an exemplary flow chart of a data processing method according to an embodiment of the invention. The data processing method may be performed by the memory controller or one or more components comprised in the memory controller, and may comprise the following steps:

Step S202: Receiving data from the host device 130 and writing (or, buffering or storing) the data received from the host device 130 into the buffer memory 116.

Step S204: Driving the data protection engine 115 to perform a data protection operation corresponding to the data and driving the memory interface 114 to perform a data write operation corresponding to the data after the data has been written in the buffer memory 116.

Step S206: Determining whether a portion of the data has to be excluded when generating the protection information of the data according to information regarding the data write operation corresponding to the data. If yes, step S208 is performed. If no, step S210 is performed.

Step S208: Removing the content related to the portion of the data from the protection information to regenerate the protection information and writing the regenerated protection information into the memory device 120.

Step S210: Writing the protection information into the memory device 120.

According to an embodiment of the invention, the host interface 118 is configured to write data received from the host device 130 into the buffer memory 116 and issue a buffer memory write complete notification after the data has been written into the buffer memory 116, so as to notify the microprocessor 112 that the data has been written into the buffer memory 116.

In response to the buffer memory write complete notification received from the host interface 118, the microprocessor 112 may drive the data protection engine 115 to perform a corresponding data protection operation for the data, so as to generate the corresponding protection data according to the data written (or, buffered or stored) in the buffer memory 116.

According to an embodiment of the invention, the microprocessor 112 may know that the data has been written in the buffer memory 116 by the buffer memory write complete notification, and the microprocessor 112 may directly trigger the data protection operation after confirming that the data has been written in the buffer memory 116. In other words, the memory controller 110 may directly perform a corresponding data protection operation to generate protection information corresponding to the data stored in the buffer memory 116 after the data has been written in the buffer memory 116. According to an embodiment of the invention, the aforementioned "directly perform/performing the data protection operation" means that the data protection engine 115 starts to perform the data protection operation before the data buffered in the buffer memory 116 is written in the memory device 120.

In addition, in response to the buffer memory write complete notification received from the host interface 118, the microprocessor 112 may also drive the memory interface 114 to perform a data write operation corresponding to the data to write the data buffered in the buffer memory 116 into the memory device 120.

According to an embodiment of the invention, in response to the aforementioned buffer memory write complete notification, the microprocessor 112 may drive the data protection engine 115 to perform the data protection operation corresponding to the data while drive the memory interface 114 to perform the data write operation corresponding to the data at the same time or at almost the same time. For example, the microprocessor 112 may issue the corresponding commands at the same time, so as to drive the data protection engine 115 and the memory interface 114 to perform the corresponding operations as discussed above. Or, the microprocessor 112 may issues the corresponding commands at different time with a tiny time difference, and the time difference between issuance of the command for driving the data protection engine 115 to perform the corresponding operation and issuance of the command for driving the memory interface 114 to perform the corresponding operation may be smaller than a predetermined value or shorter than a predetermined number of clock pulses. The command for triggering the data protection operation may be issued earlier or later than command for triggering the data write operation.

In addition, in an embodiment of the invention, the microprocessor 112 may drive the data protection engine 115 to perform the data protection operation corresponding to the data before the data write operation corresponding to the data is completed. In another embodiment of the invention, the microprocessor 112 may drive the memory interface 114 to perform the data write operation corresponding to the data before the data protection operation corresponding to the data is completed.

It should be noted that in other embodiments of the invention, the microprocessor 112 may also issue corresponding commands at different time with a significant time difference to drive the data protection engine 115 and the memory interface 114 to perform the corresponding operations as discussed above.

In addition, according to an embodiment of the invention, performance time of the data protection operation performed by the data protection engine 115 and performance time of the data write operation performed by the memory interface 114 corresponding to the same data may be overlapped. In this manner, the time required for the buffer memory 116 to keep buffering the data can be greatly shortened.

Figure 3:
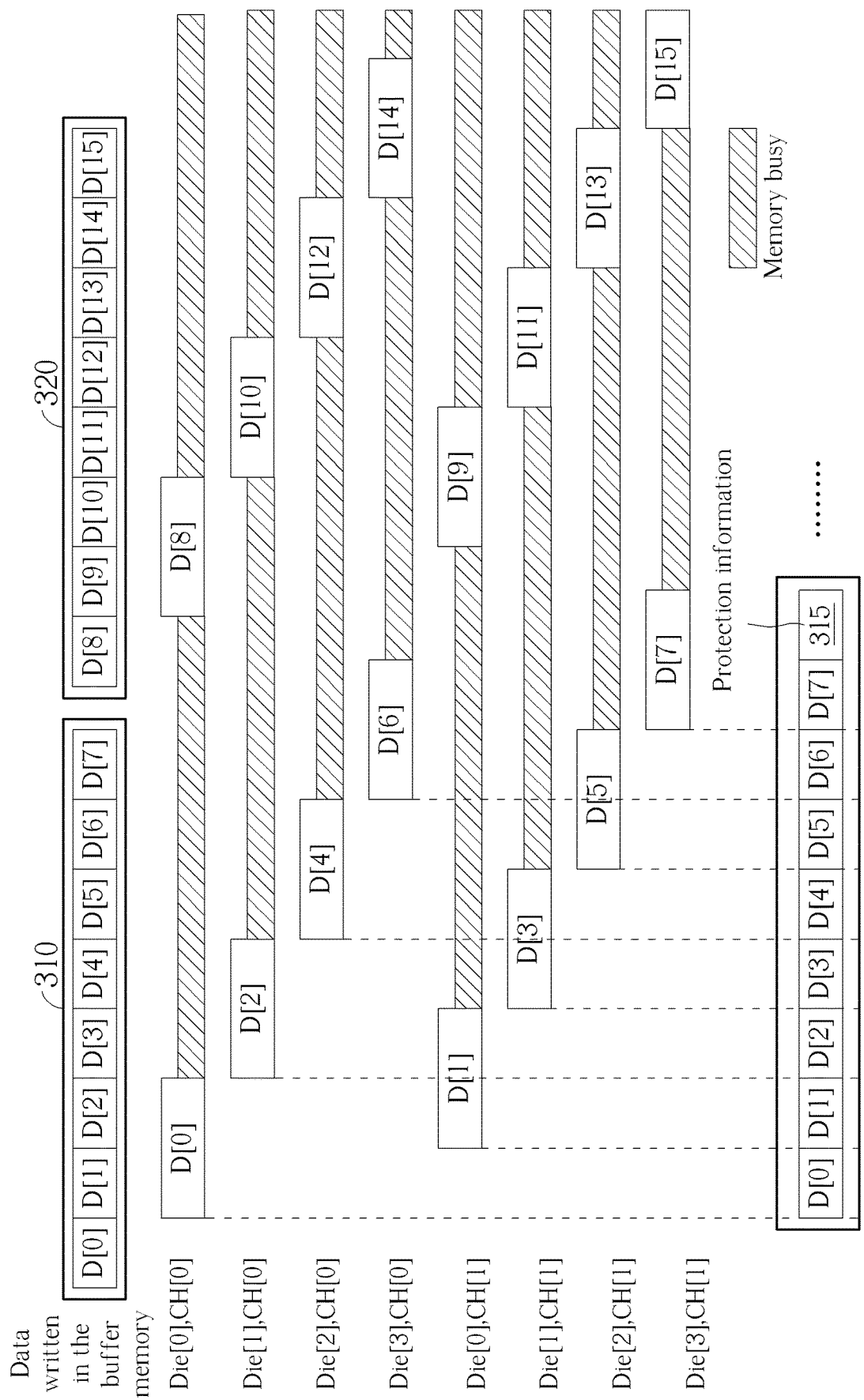
FIG. 3 shows an exemplary task scheduling of the memory controller according to an embodiment of the invention.

FIG. 3 shows an exemplary task scheduling of the memory controller according to an embodiment of the invention, where the X-axis is the time axis. In this embodiment, the host device 130 wants to write two data (two host data) in the memory device 120. The data 310 written in the buffer memory 116 is the first host data and the data 320 written in the buffer memory 116 is the second host data. Each host data may comprise a plurality of portions, such as the data portions D[0]~D[7] and D[8]~D[15] (shown in the first row in FIG. 3), wherein one data portion may comprise, for example, one page or a predetermined number of pages.

In addition, in this embodiment, the memory device 120 may comprise eight memory dies, the memory interface 114 may comprise two transmission channels CH[0] and CH[1], and each transmission channel may be respectively coupled to four memory dies for transmitting the data of the corresponding four memory dies. Therefore, the data processing operations of the memory dies Die[0]~Die[3] coupled to the channel CH[0] and the data processing operations of the memory dies Die[0]~Die[3] coupled to the channel CH[1] are respectively shown in FIG. 3. Under the multi-die and multi-channel structure, with proper task scheduling, the microprocessor 112 may write the data into the memory device 120 via multiple channels in a parallel manner, and the data write is performed more efficiently.

In the exemplary scheduling shown in FIG. 3, the data length (that is, the length of the boxes) distributed along the time axis shows the relative time required for processing the data. In FIG. 3, the first row shows the operations of writing the host data into the buffer memory 116, the second row to the ninth row respectively show the operations of transmitting the host data that is buffered in the buffer memory 116 to the memory device 120 via the channels CH[0] and CH[1] and then writing the data into the corresponding memory dies, and the bottom row shows the operations of generating the protection information according to the host data performed by the data protection engine 115.

As show in FIG. 3, taking the operations shown in the second row as an example, the box labeled as data D[0] represents the operation of transmitting the data D[0] on the channel CH[0], and the boxes filled with slashes stands for a status of memory busy. During the process of writing or programming the data D[0] into the corresponding memory die Die[0], the memory device is in a busy state. Therefore, a corresponding busy flag may be set for indicating the busy status of the memory device. After the programming is completed, the corresponding busy flag may be reset, so as to indicate that the memory device is now not in a busy state.

In addition, the bottom row in FIG. 3 shows that the data protection engine 115 sequentially reads the host data that has been written in the buffer memory 116 and generates the corresponding protection information based on the read host data. For example, the data protection engine 115 may generate the protection information 315 corresponding to the first data 310 and the protection information corresponding to the second data 320 (which is not shown in the figure due to drawing font restrictions).

According to an embodiment of the invention, for the same data, the microprocessor 112 may drive the data protection engine 115 to perform the data protection operation corresponding to the data while drive the memory interface 114 to perform the data write operation corresponding to the data at the same time or at almost the same time. In addition, performance time of the data protection operation and performance time of the data write operation corresponding to the same data buffered in the buffer memory 116 may be overlapped.

In addition, as discussed above, the data received from the host device 130 may comprise a plurality of portions, such as the data D[0]~D[7] and D[8]~D[15] shown in FIG. 3, and the microprocessor 112 may directly drive the data protection engine 115 to perform the data protection operation on each portion of the data after confirming that the portion of the data has been written in the buffer memory 116 (for example, the confirmation may be made based on the buffer memory write complete notification corresponding to each portion of the data). For example, as shown by the dotted line in the vertical direction in FIG. 3, the corresponding data write operation and data protection operation are performed or executed immediately right after the data D[0]~D[7] and D[8]~D[15] has been written into the buffer memory 116.

In the embodiment of the invention, for the data, such as the data 310, after the data write operation of writing the data 310 into the memory device 120 is completed, the corresponding memory space utilized for storing the data 310 can be released and utilized for storing next data that the host device 130 intends to write. This is because that for the same data, the performance speed of the data protection operation performed by the data protection engine 115 is usually faster than that of the data write operation performed by the memory interface 114.

In this manner, whenever the memory busy status is ended, the corresponding data write operation and data protection operation of the next data can be performed or executed immediately. That is, different from the conventional design in which the performance time of the data write operation and the performance time of the data protection operation should be interleaved (non-overlapped), in the embodiments of the invention, there is no need to wait for the end of the data write operation and wait for the end of the busy status of the memory device to start the data protection operation. In addition, in the conventional design, the memory space of the buffer memory 116 utilized for storing the host data cannot be released and utilized for storing the next data that the host device 130 intends to write until the data protection operation that is performed later is completed, which greatly degrades the memory space utilization of the buffer memory 116 and the write efficiency of the memory device 120.

Different from the conventional design, in the proposed data processing method, both the memory space utilization of the buffer memory 116 and the write efficiency of the memory device 120 can be greatly improved via the proposed task scheduling as discussed above.

Since the data protection operation is performed in advance before confirming that the data has been successfully written into the memory device 120, in the embodiments of the invention, as shown in step S206, the microprocessor 112 may be configured to further determine whether a portion of the data has to be excluded when the data protection engine 115 is generating the protection information corresponding to each data according to information regarding the data write operation corresponding to the data.

When the microprocessor 112 determines that a portion (for example, one or more pages) of the data has to be excluded in step S206, the microprocessor 112 may be configured to further instruct the data protection engine 115 to perform a data removal operation to remove content related to the portion of the data from the protection information, which is equivalent to the result of generating the protection information according to the remaining portion of the data not including the portion of the data that should be excluded. Or, the microprocessor 112 may instruct the data protection engine 115 to exclude the aforementioned portion from the data and then regenerate the corresponding protection information. That is, the data protection engine 115 may regenerate the protection information according to the remaining portion of the data in which the aforementioned portion of the data that should be excluded is not included. It should be understood that the aforementioned operations are all regarded as the operations of regenerating the protection information, and the protection information generated thereby shall all be regarded as the regenerated protection information.

In the embodiments of the invention, the aforementioned data removal operation may be a reverse operation of generating the protection information. For example, when the data protection engine 115 generates the protection information by performing the Exclusive-OR (XOR) calculation, the data removal operation may be the reverse of the XOR calculation. It should be noted that the data protection engine 115 may also generate the protection information by performing other calculations. Therefore, the invention should not be limited to the aforementioned XOR calculation.

In addition, in the embodiments of the invention, the aforementioned "information regarding the data write operation" may comprise the status of the memory device 120 and/or the status of the data that has been written in the memory device 120.

For example, the microprocessor 112 may detect a status message responded by the memory device 120 after performing the write operation to obtain the information regarding whether the write operation is successful or failed. The microprocessor 112 may actively query the status of the memory device 120 and wait for the status message responded by the memory device 120. When the status message indicated that the write operation of some portion of the data has failed, the microprocessor 112 may determine that this portion of the data has to be excluded when the data protection engine 115 is generating the protection information corresponding to the data, and instruct the data protection engine 115 to exclude the content related to this portion of the data and regenerate the protection information (that is, regenerate the protection information without the content related to this portion of the data).

For another example, the voltage detection circuit 136 may issue a message to notify the microprocessor 112 when detecting voltage change occurred in the power source of the memory device 120 (for example, the voltage drop or unstable voltage of the power source, or the power off event of the memory device), so that the microprocessor 112 knows the status of the memory device 120 when performing the write operation. When the status information indicates that voltage change in the power source of the memory device 120 has occurred when performing the data write operation on some portion of the data, since the unstable voltage may cause error in the written data or cause the data unable to be written into the memory device 120, the microprocessor 112 may determine that this portion of the data has to be excluded when the data protection engine 115 is generating the protection information corresponding to the data, and instruct the data protection engine 115 to exclude the content related to this portion of the data and regenerate the protection information (that is, regenerate the protection information without the content related to this portion of the data).

For yet another example, the microprocessor 120 may determine the status of the memory device 120 when performing the write operation based on the status of the data storage device 100. When an SPO has occurred in the data storage device 100 during the time when the memory device 120 is performing the data write operation, the memory device 120 suffered the SPO as well. Since the SPO may attack the data that is being written into the memory device, when the status indicates that SPO has occurred when the memory device 120 is performing the data write operation corresponding to some portion of the data, the microprocessor 120 may determine that this portion of the data has to be excluded when the data protection engine 115 is generating the protection information corresponding to the data, and instruct the data protection engine 115 to exclude the content related to this portion of the data and regenerate the protection information (that is, regenerate the protection information without the content related to this portion of the data).

According to another embodiment of the invention, the microprocessor 112 may read the data written in the memory device 120 and try to decode the data via the decoder 134, so as to check whether any error has occurred in the data (for example, to check whether there are too many error bits causing the decoder 134 to be unable to correct the erroneous content). When the status of the data written in the memory device 120 indicates that error or uncorrectable error has occurred in a portion of the data, the microprocessor 120 may determine that this portion of the data has to be excluded when the data protection engine 115 is generating the protection information corresponding to the data, and instruct the data protection engine 115 to exclude the content related to this portion of the data and regenerate the protection information (that is, regenerate the protection information without the content related to this portion of the data).

As discussed above, in the proposed data processing method, performance time of the data protection operation and performance time of the data write operation corresponding to the same data may be overlapped via the aforementioned task scheduling, and performance of the data protection operation and performance of the data write operation may be stated at the same time or at almost the same time. Or, the data protection operation may be performed in advance before the data write operation is completed. Since the data protection operation is performed in advance (that is, earlier than the conventional design) and even after the protection information is generated, the protection information can still be adjusted according to the information regarding the data write operation, both the memory space utilization of the buffer memory 116 and the write efficiency of the memory device 120 can be greatly improved as compared to the conventional design.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A memory controller, coupled to a memory device and a host device and configured to control access operations of the memory device, comprising:
 a buffer memory;
 a host interface, coupled to the host device and configured to write data received from the host device into the buffer memory and issue a buffer memory write complete notification after the data has been written in the buffer memory;
 a memory interface, coupled to the memory device;
 a microprocessor, configured to trigger a data protection operation in response to the buffer memory write complete notification; and
 a data protection engine, configured to perform the data protection operation according to the data written in the buffer memory to generate protection information corresponding to the data,
 wherein the microprocessor is configured to directly trigger the data protection operation after confirming that the data has been written in the buffer memory,
 wherein in response to the buffer memory write complete notification, the microprocessor is further configured to drive the memory interface to perform a data write operation, and in the data write operation, the memory interface is configured to write the data written in the buffer memory into the memory device, and
 wherein the microprocessor is further configured to determine whether a portion of the data has to be excluded when the data protection engine is generating the protection information corresponding to the data according to the data write operation corresponding to the data, and when the microprocessor determines that the portion of the data has to be excluded when generating the protection information corresponding to the data, the microprocessor is further configured to instruct the data protection engine to remove content related to the portion of the data from the protection information.

2. The memory controller of claim 1, wherein the data received from the host device comprises a plurality of portions, and the microprocessor is configured to directly drive the data protection engine to perform the data protection operation on each portion of the data after confirming that the portion of the data has been written in the buffer memory.

3. The memory controller of claim 1, wherein in response to the buffer memory write complete notification, the microprocessor is configured to drive the data protection engine to perform the data protection operation while drive the memory interface to perform the data write operation at the same time.

4. The memory controller of claim 1, wherein performance time of the data protection operation corresponding to the data and performance time of the data write operation corresponding to the data are overlapped.

5. The memory controller of claim 1, wherein the microprocessor is configured to drive the data protection engine to perform the data protection operation corresponding to the data before the data write operation corresponding to the data is completed.

6. A data processing method, performed by a memory controller coupled to a memory device, comprising:
 writing data received from a host device into a buffer memory of the memory controller; directly performing a data protection operation to generate protection information corresponding to the data after the data has been written in the buffer memory;
 performing a data write operation to write the data written in the buffer memory into the memory device after the data has been written in the buffer memory;
 determining whether a portion of the data has to be excluded when generating the protection information corresponding to the data according to the data write operation corresponding to the data; and
 when determining that the portion of the data has to be excluded when generating the protection information corresponding to the data, performing a data removal operation to remove content related to the portion of the data from the protection information.

7. The data processing method of claim 6, wherein the data received from the host device comprises a plurality of portions, and a data protection engine of the memory controller is directly driven to perform the data protection operation on each portion of the data after the portion of the data has been written in the buffer memory.

8. The data processing method of claim 6, wherein the data protection operation corresponding to the data and the data write operation corresponding to the data are performed at the same time.

9. The data processing method of claim 6, wherein performance time of the data protection operation corresponding to the data and performance time of the data write operation corresponding to the data are overlapped.

10. The data processing method of claim 6, wherein the data protection operation corresponding to the data is performed before the data write operation corresponding to the data is completed.

* * * * *